(12) United States Patent
Huang et al.

(10) Patent No.: US 12,425,431 B2
(45) Date of Patent: Sep. 23, 2025

(54) FAULT TOLERANCE METHODOLOGY TO DETECT AND RECOVER NETWORK UPLINK FAULT AUTOMATICALLY

(71) Applicant: TXONE NETWORKS INC., Hsinchu (TW)

(72) Inventors: Yung-Wen Huang, Hsinchu (TW); Kin Leung Ling, Hsinchu (TW)

(73) Assignee: TXONE NETWORKS INC., Hsinchu (TW)

( * ) Notice: Subject to any disclaimer, the term of this patent is extended or adjusted under 35 U.S.C. 154(b) by 66 days.

(21) Appl. No.: 18/206,442

(22) Filed: Jun. 6, 2023

(65) Prior Publication Data
US 2024/0414179 A1 Dec. 12, 2024

(51) Int. Cl.
*H04L 45/745* (2022.01)
*H04L 9/40* (2022.01)

(52) U.S. Cl.
CPC ........ *H04L 63/1425* (2013.01); *H04L 45/745* (2013.01)

(58) Field of Classification Search
CPC .......... H04L 63/1425; H04L 45/745
See application file for complete search history.

(56) References Cited

U.S. PATENT DOCUMENTS

| | | | |
|---|---|---|---|
| 9,264,301 B1* | 2/2016 | Chua | H04L 63/107 |
| 2015/0372898 A1* | 12/2015 | Haramaty | H04L 49/557 |
| | | | 370/225 |
| 2017/0005921 A1 | 1/2017 | Liu et al. | |
| 2018/0109446 A1 | 4/2018 | Srinivasan et al. | |
| 2020/0244569 A1* | 7/2020 | Gao | H04L 61/103 |
| 2024/0291749 A1* | 8/2024 | Gandelman Milgrom | H04L 45/745 |

FOREIGN PATENT DOCUMENTS

| | | | | |
|---|---|---|---|---|
| EP | 2343864 A2 * | 7/2011 | ......... | H04L 63/1408 |
| WO | WO-2012024952 A1 * | 3/2012 | ............. | H04L 45/22 |

OTHER PUBLICATIONS

Search Report dated Jan. 23, 2024 of the corresponding European patent application No. 23177697.2.

* cited by examiner

*Primary Examiner* — Glenton B Burgess
*Assistant Examiner* — Patrick F Ngankam
(74) *Attorney, Agent, or Firm* — HDLS IPR SERVICES; Chun-Ming Shih

(57) ABSTRACT

A network security device receives a traffic flow through an input port from a source device and forwards the traffic flow through a primary output port to a primary switch. The network security device switches from the primary output port to a backup output port when determining that the traffic flow fails to be forwarded by the primary switch to a destination device, and forwards the traffic flow through the backup output port to a backup switch. The traffic flow that is forwarded from the primary switch to the destination device is changed to be forwarded through the backup switch to the destination device.

7 Claims, 7 Drawing Sheets

FAULT TOLERANCE METHODOLOGY TO DETECT AND RECOVER NETWORK UPLINK FAULT AUTOMATICALLY

BACKGROUND OF THE DISCLOSURE

Technical Field

The disclosure generally relates to a network device, and more particularly, to a network security device.

Description of Related Art

Based on the development of Information and Communication Technology (ICT) and the demand of the communication, throughputs of telecommunication networks increase dramatically. Data sent by a host device in a service system is forwarded by several relay devices, through several links among the relay devices, and then arrives the destination device. The service system has to provide instant and uninterrupted service, that is, each link for forwarding the data must maintain connection at all times.

In general, the administrator has to immediately send an engineer to troubleshoot the malfunction to recover the connection when being aware of the disconnection. During the period of troubleshooting, the data of the host device cannot be immediately forwarded to the destination device, such that the efficiency of the service system decreases, and the service system fails in providing uninterrupted service. In some circumstances, the correctness and the stability of the service system is affected because the data does not arrive the destination device.

SUMMARY OF THE DISCLOSURE

One of the exemplary embodiments is to provide a network security device including a plurality of communication ports and a processor. The plurality of communication ports includes a plurality of input ports and a plurality of output ports. The plurality of input ports includes a first input port, where the first input port is communicatively connected with a first source device. The plurality of output ports includes a first primary output port communicatively connected with a first primary switch and a first backup output port communicatively connected with a first backup switch, where each of the plurality of output ports and each of the plurality of input ports has a correspondence. The processor is connected with the plurality of communication ports and configured to: receive a first traffic flow of the first source device by the first input port, where the first traffic flow carries information of a destination device: forward the first traffic flow from the first primary output port to the first primary switch; and switch from the first primary output port to the first backup output port when determining that the first traffic flow fails to be forwarded by the first primary switch to the destination device and forward the first traffic flow by the first backup output port to the first backup switch, such that the first traffic flow that is forwarded from the primary switch to the destination device is changed to be forwarded from the backup switch to the destination device.

One of the exemplary embodiments is to provide a network security device including a plurality of communication ports and a processor. The plurality of communication ports includes an input port, a primary output port, and a backup output port. The input port is communicatively connected with a source device. The primary output port is communicatively connected with a first port of a switch, where the primary output port and the input port are configured to be paired. The backup output port is communicatively connected with a second port of the switch, where the backup output port and the primary output port are configured to be paired. The processor is connected with the plurality of communication ports and configured to: receive a traffic flow of the source device by the input port, wherein the traffic flow carries information of a destination device: forward the traffic flow from the primary output port to the first port; and switch from the primary output port to the backup output port when determining that the traffic flow fails to be forwarded by the primary output port to the destination device, and forward the traffic flow by the backup output port to the second port, so the switch forwards the traffic flow to the destination device.

DETAILED DESCRIPTION

Figure 1:
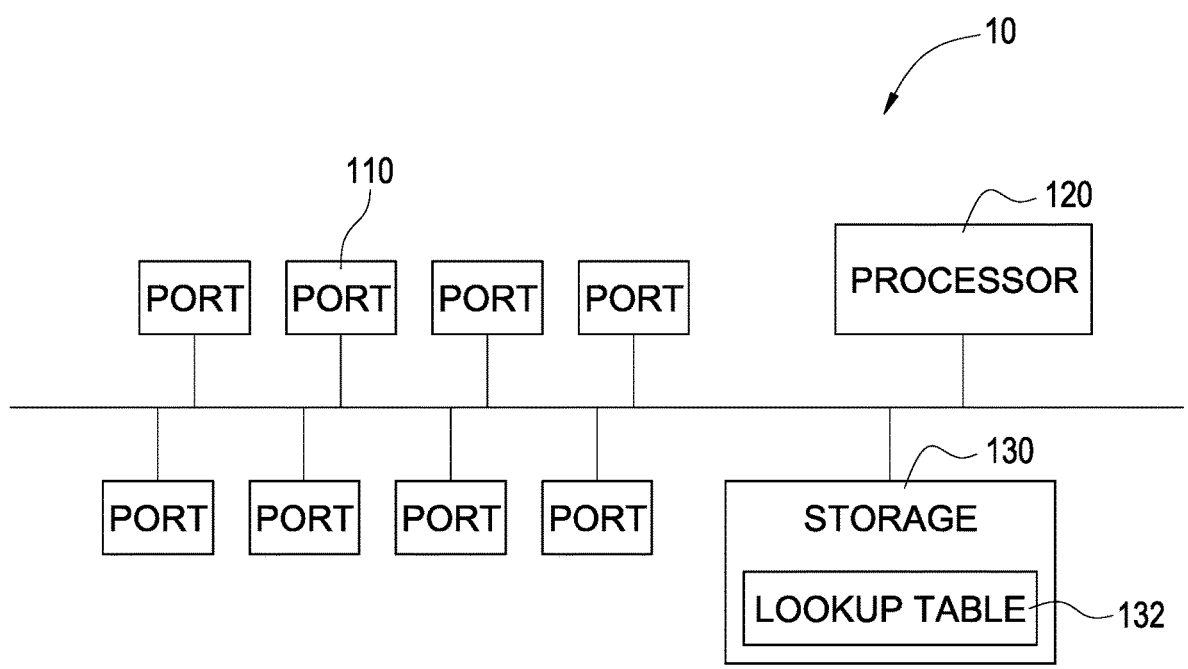
FIG. 1 is a block diagram illustrating a network security device in accordance with one embodiment of the present disclosure.

The technical terms "first", "second" and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Reference will now be made in detail to the present embodiments of the disclosure, examples of which are illustrated in the accompanying drawings. Wherever possible, the same reference numbers are used in the drawings and the description to refer to the same or like parts.

Generally, the administrator deploys multiple network devices (such as switches) to establish a service system. In the service system, multiple terminal nodes are communicatively connected with the network devices and transmit data to the destination device through the network devices in the communication topology. The packet loss rate of the service system increases and the overall service performance decreases if the link between the source device (such as one of the multiple terminal nodes) and the destination device for transmitting the data is disconnected, e.g., a switch is crashed.

For preventing the problem of service interruption which is induced by the crashed switch or other unknown events, the present disclosure provides a network security device that recovers the network service immediately. The network security device communicatively connects with a source device (such as the Internet of Things (IoT) devices) and multiple switches. Data sent from the source device is forwarded through the network security device to one of the switches and then passed through the switch in the network topology to the destination device (e.g., a human-machine interface device or a monitoring device). In some circumstances, the destination device is the IoT device, and the source device is the human-machine interface device or the monitoring device, but not limited.

Reference is made to FIG. 1. FIG. 1 is a block diagram illustrating a network security device in accordance with one embodiment of the present disclosure. The network security device 10 includes a plurality of communication ports 110, a processor 120, and a storage 130. The processor 120 is connected with the communication ports 110 and the storage 130.

In one embodiment, the communication ports 110 include a plurality of input ports and a plurality of output ports (not specified in the figure). Each of the input port is configured to communicatively connect with the source device. Each of the output port is configured to communicatively connect with the switch. Each of the plurality of input ports and each of the plurality of output ports are paired.

In one embodiment, each input port is paired with one or more than one output ports. When one input port is paired with more than one output ports, one of the paired output ports is a primary output port and the other paired output port(s) is/are backup output port(s).

In the embodiment that one input port is paired with one output port, the network security device 10 receives data from the source device by the input port and forwards the data by the paired output port to the switch to which the paired input port connects.

In the embodiment that one input port is paired with two output ports, the network security device 10 receives the data from the source device by the input port and forwards the data by a first output port that is paired with the input port (e.g., the primary output port) to the switch to which the first output port connects. If the data sent by the first output port of the network security device 10 is not successfully forwarded to the destination device, the network security device 10 immediately forwards the data by a second output port that is paired with same input port (e.g., the backup output port) to the switch to which the second output port connects. Accordingly, the problem of data transmission failure is immediately resolved.

It should be noted that the number of the communication port 110 is not limited in the present disclosure.

In one embodiment, the communication port 110 may be the RJ45 connection port.

In one embodiment, the storage 130 is configured to store a lookup table 132. The lookup table 132 stores a correspondence between each input port and each output port. The correspondence is described below. In one embodiment, the lookup table 132 stores a backup relationship between each primary output port and the corresponding backup output port.

In one embodiment, each of the communication ports 110 of the network security device 10 has a port number. The port number of the output ports is odd, and the port number of the input ports is even. For example, if the network security device 10 has 24 communication ports 110, the port number of the output ports is 1, 3, 5, . . . , 23 and the port number of the input ports is 2, 4, 6, . . . , 24.

Figure 2:
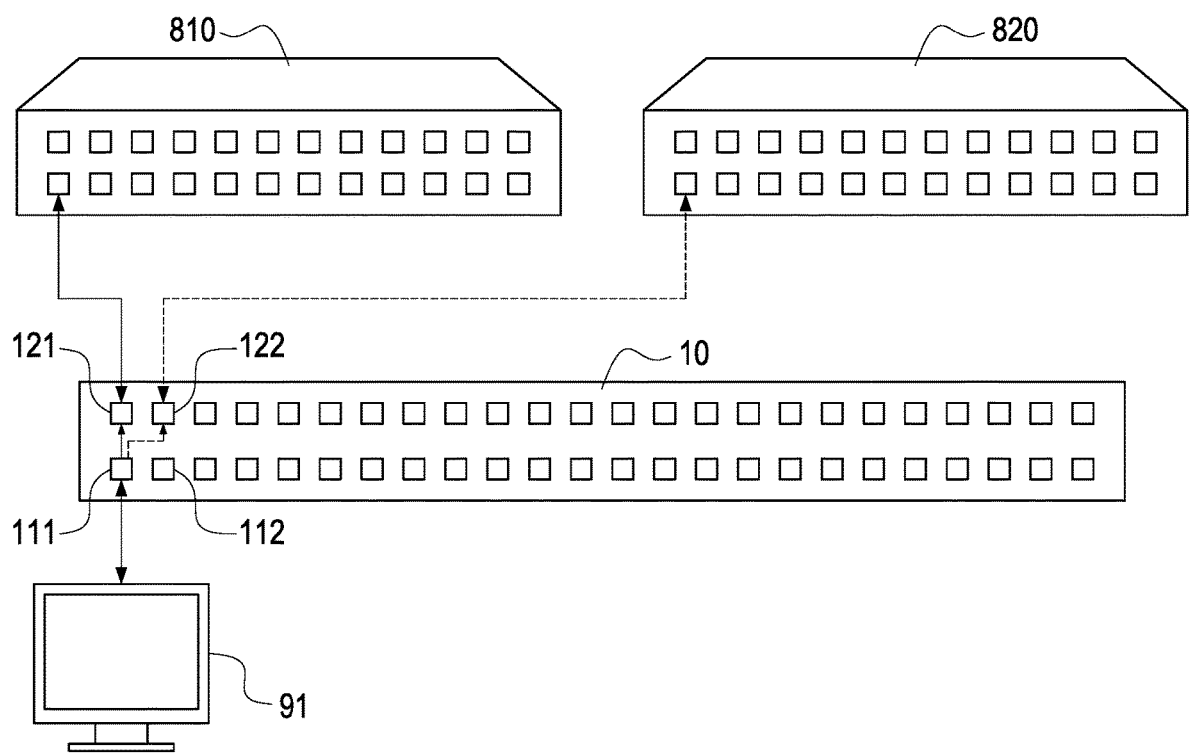
FIG. 2 illustrates an arrangement of the network security devices in accordance with one embodiment of the present disclosure.

In one embodiment, the network security device 10 is configured with a set of input ports and output ports that are paired with each other to the source device (as the source device 91 as shown in FIG. 2) in advance. Furthermore, each of the output ports is paired with at least one other output port. Accordingly, the network security device 10 regards two output ports as the primary output port and the backup output port of the source device 91.

In one embodiment, an output port is communicatively connected with a switch.

In another embodiment, some output ports are communicatively connected with a switch, and the other output ports are communicatively connected with another switch. The two types of configurations are described below.

In one embodiment, the processor 120 may be but not limited to a Digital Signal Processor (DSP), an Application Specific Integrated Circuit (ASIC), a Central Processing Unit (CPU), a System on Chip (SoC), a Field Programmable Gate Array (FPGA), or a Network Processor IC.

In one embodiment, the storage 130 may be but not limited to a Random Access Memory (RAM), a nonvolatile memory (such as flash memory), a Read-Only Memory (ROM), a Hard Disk Drive (HDD), a Solid-State Drive (SSD), or an Optical Storage.

The following describes that the correspondence is provided by the network security device 10 and is between the input port and two output ports, and the communication ports indicated by the correspondence are utilized to forward the data of a source device. For the sake of conciseness, the data transferred in the service system is called 'traffic flow'.

Reference is made to FIG. 2. FIG. 2 illustrates an arrangement of the network security devices in accordance with one embodiment of the present disclosure. The plurality of communication ports 110 of the network security device 10 include the plurality of input ports and the plurality of output ports. For easily understanding, input ports 111 and 112 and output ports 121 and 122 are taken as an example in the following.

In one embodiment, the input port 111 of the network security device 10 is communicatively connected with a source device 91 (i.e., a first source device). The output port 121 of the network security device 10 (i.e., a first primary output port) is communicatively connected with a switch 810 (i.e., a first primary switch). The output port 122 of the network security device 10 (i.e., a first backup output port) is communicatively connected with a switch 820 (i.e., a first backup switch). In the embodiment, the input port 112 is not connected with any device yet.

In one embodiment, the switch 810 and the switch 820 are two isolated physical relay devices that operate independently.

In one embodiment, in the default situation, the input port 111 of the network security device 10 receives a traffic flow (i.e., a first traffic flow) that is sent by the source device 91, and the network security device 10 forwards the traffic flow by the output port 121 to the switch 810. In the meantime, the output port 121 is in an operating state and the output port 122 is in an idle state.

The network security device 10 allocates the communication ports 110 based on the source device 91 for transferring the traffic flow of the source device 91 and sets the related communication ports 110 in a correspondence. In one embodiment, the input port 111 has the respective correspondence with both the output port 121 and the output port 122, and the output port 121 and the output port 122 have a backup relationship. The traffic flow received by the input port 111 of the network security device 10 is forwarded first by the output port 121 of the network security device 10 to the switch 810. In another embodiment, if the traffic flow fails to be forwarded to the switch 810, the network security device 10 changes the output port to forward the traffic flow received by the input port 111 to the output port 122 and forwards the traffic flow by the output port 122 to the switch 820.

As described above, the output port 121 is the primary output port paired with the input port 111, and the output port 122 is the backup output port paired with the input port 111. In one embodiment, the network security device 10 selects two ports whose physical port position is adjacent to each other to be the primary output port and the backup output port of the same input port, but it is not limited to. In another embodiment, the network security device 10 selects two output ports with any physical port position to be the primary output port and the backup output port of the same input port.

Because the traffic flow carries the information of the destination device (e.g., the internet protocol address of the destination device), the service system forwards the traffic flow to the destination device based on the network topology and the routing rule. In some circumstances, the link disconnection either from the source device 91, from the network security device 10, from the switch 810, or from one or more relay devices (not shown in figures) to the destination device may occur, it results in that the traffic flow sent by the source device 91 cannot be successfully forwarded to the destination device.

In one embodiment, when determining that the traffic flow fails to be forwarded to the destination device by the output port 121, the network security device 10 switches the communication port of forwarding the traffic flow from the output port 121 to the output port 122. In this case, the traffic flow is forwarded by the output port 122 to the switch 820 and further forwarded by the switch 820 to the destination device.

In one embodiment, the input port 111 for receiving the traffic flow has a default configuration with the output port 121 and the output port 122 for transmitting the traffic flow. In another embodiment, the input port 111 for receiving the traffic flow has a default corresponding relationship with the output port 121 for transmitting the traffic flow with a higher priority, and the output port 121 has a default backup relationship with the output port 122 that is a backup port for transmitting the traffic flow.

It should be noted that in the normal process, the traffic flow is forwarded by the switch 810 to the next relay device and then to the destination device in the end. Because the switch 820 is the backup switch, the traffic flow may also be forwarded by the switch 820 to the next relay device and then to the destination device in the end. In the present disclosure, the number of relay devices and the routing paths that the traffic flow may be forwarded from the switch 810 or the switch 820 to the destination device is not limited.

In the embodiment, the output port 121 is the primary output port, and the output port 122 is the backup output port. The primary output port is the output port having the highest priority set by the network security device 10 based on the source device 91, and the backup output port is the output port having the second high priority set by the network security device 10 based on the source device 91.

In one embodiment, the method of determining whether the traffic flow is forwarded to the destination device includes determining whether the source device 91 receives the ack message from the destination device, periodically detecting the on or off-state of the communication port 110 by the network device 10, or detecting the state of the communication port of the switch that is connected with the communication port 110 of the network device 10 (e.g., detecting the upstream state or the downstream state of the communication port (not shown in figures) of the switch 810 that is connected with the output port 121 of the network security device 10 in FIG. 2), but it is not limited herein.

In one embodiment, if determining that the traffic flow fails to be forwarded through the output port 121 to the destination device via any possible path, the network security device 10 searches the lookup table 132 for the correspondence of the communication port 110 associated with the source device 91. In the embodiment, the communication ports 110 associated with the source device 91 includes the input port 111, the output port 121, and the output port 122 where the output port 121 is the primary output port and the output port 122 is the backup output port. The network security device 10 may retrieve the correspondence and the backup relationship of the communication ports 110 associated with the source device 91 by the preset configurations or by searching the lookup table 132. Accordingly, the network security device 10 immediately switches to another available output port when determining that the link from the primary output port to the destination device fails to work correctly, so the effectiveness of immediately solving the disconnection problem is achieved.

In one embodiment, each communication port 110 has a unique identifier, a physical media access control (MAC) address, or a combination thereof.

In one embodiment, the correspondence stored in the lookup table 132 (as shown in FIG. 1) includes the relationship that the input port 111 (i.e., a first primary input port) respectively maps to the unique identifier of the output port 121 (i.e., a first primary output port) and the output port 122 ((i.e., first backup output port). The backup relationship stored in the lookup table 132 includes the relationship that the output port 121 maps to the unique identifier of the output port 122. In another embodiment, the correspondence stored in the lookup table 132 includes the relationship that the input port 111 respectively corresponds to the physical MAC address of the output port 121 and the physical MAC address of the output port 122, and the backup relationship stored in the lookup table 132 includes the relationship that the output port 121 corresponds to the physical MAC address of the output port 122. In other words, the correspondence of the communication ports 110 is set based on the physical port of the network security device 10, so the transmission of the traffic flow from the source device 91 is not affected by other source devices (not shown in figures).

In one embodiment, if the network security device 10 fails to forward the traffic flow by the output port 121 of the switch 810 to the correct destination device, the user may replace the switch 810 with a new switch, and the new switch is configured to have the same settings of the switch 810. In one embodiment, after the network security device 10 switches to the backup output port (i.e., the output port 122) to forward the traffic flow, the backup output port (i.e., the output port 122) is then set as the primary output port and the traffic flow is continuously forwarded by the output port 122 to the correct destination device. At this time, the network security device 10 regards the previous primary output port (i.e., the output port 121) as the backup output port and keeps the output port idle. In the embodiment, if determining that the traffic flow fails to be forwarded by the primary output port (the output port 122 in this case) to the destination device, the network security device 10 changes to utilize the backup output port (the output port 121 in the case) to forward the traffic flow to the correct destination device. Also, the network security device 10 regards the output port 121 as the primary output port again and regards the output port 122 as the backup output port, so the traffic flow is continuously forwarded by the output port 121 and the output port 122 is kept idle.

In another embodiment, the network security device 10 only temporarily uses the backup output port (i.e., the output port 122) to forward the traffic flow. Whenever determining that the output port 121 and the switch 810 are capable of forwarding the traffic flow to the destination device, the network security device 10 automatically switches from the backup output port (i.e., the output port 122) back to the primary output port (i.e., the output port 121) and forwards the traffic flow by the primary output port. In the embodiment, the primary output port (i.e., the output port 121) is in the operating state, and the backup output port (i.e., the output port 122) is in the idle state.

Figure 3:
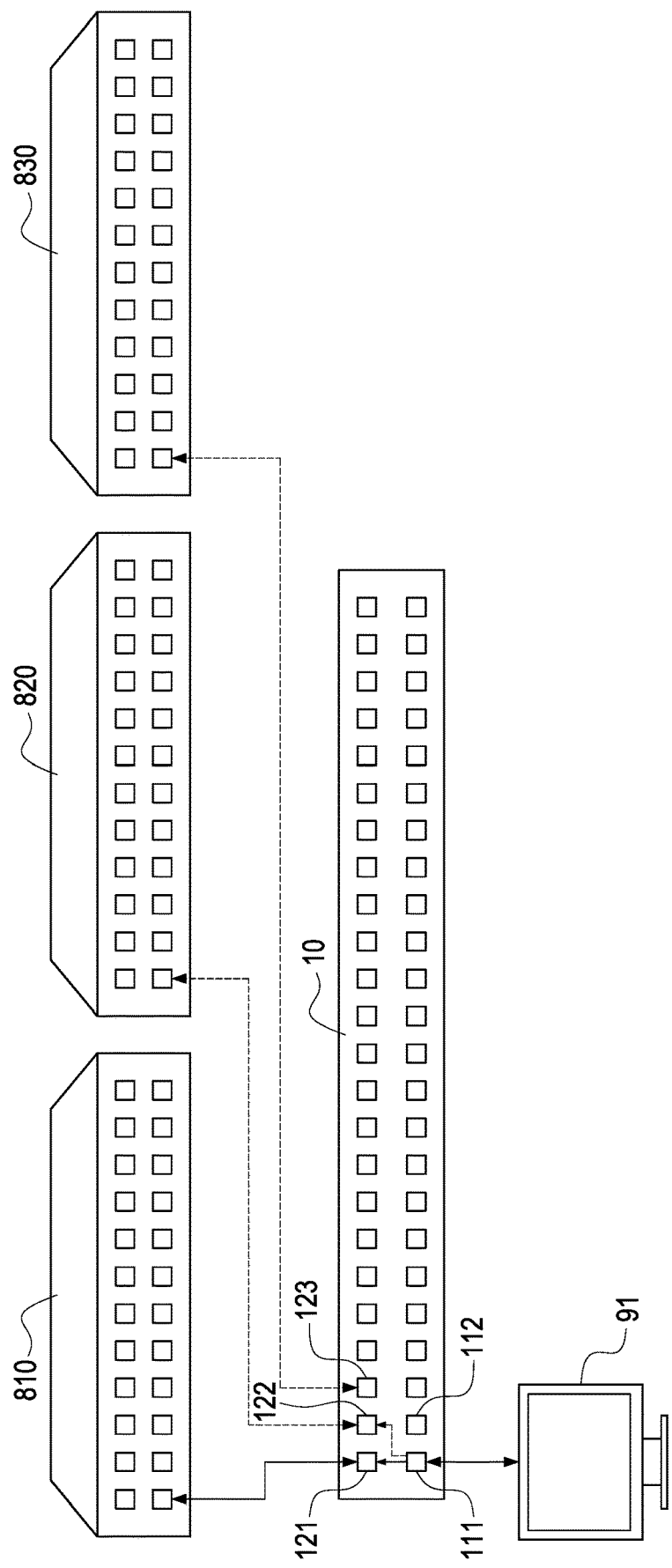
FIG. 3 illustrates an arrangement of the network security devices in accordance with another embodiment of the present disclosure.

Reference is made to FIG. 3. FIG. 3 illustrates an arrangement of the network security devices in accordance with another embodiment of the present disclosure. Compared with FIG. 2 that the network security device 10 sets one primary output port and one backup output port for forwarding the traffic flow of the source device 91, the network security device 10 in FIG. 3 sets one primary output port 121 corresponding to multiple backup output ports 122 and 123 in the backup relationship. The communication ports in the backup relationship are used to forward the traffic flow of the source device 91.

In one embodiment, each backup output port is set with a different priority and is communicatively connected with an independent switch. As shown in FIG. 3, the backup output port 122 is communicatively connected with the switch 820, and the backup output port 123 is communicatively connected with the switch 830.

In one embodiment, the network security device 10 selects the output port for forwarding the traffic flow according to the priority of the backup output ports 122 and 123. For example, the priority of the backup output port 122 is higher than the priority of the backup output port 123, so the backup output port 122 is selected first to forward the traffic flow when the traffic flow fails to be forwarded by the primary output port 121 from the switch 810 to the destination device.

In one embodiment, if the traffic flow fails to be forwarded by the backup output port 122 from the switch 820 to the destination device, the network security device 10 forwards the traffic flow by the backup output port 123 from the switch 830 to the destination device.

It should be noted that the network security device 10 in FIG. 3 has two backup output ports for example, but it is not limited to the number of the backup output ports.

Figure 4:
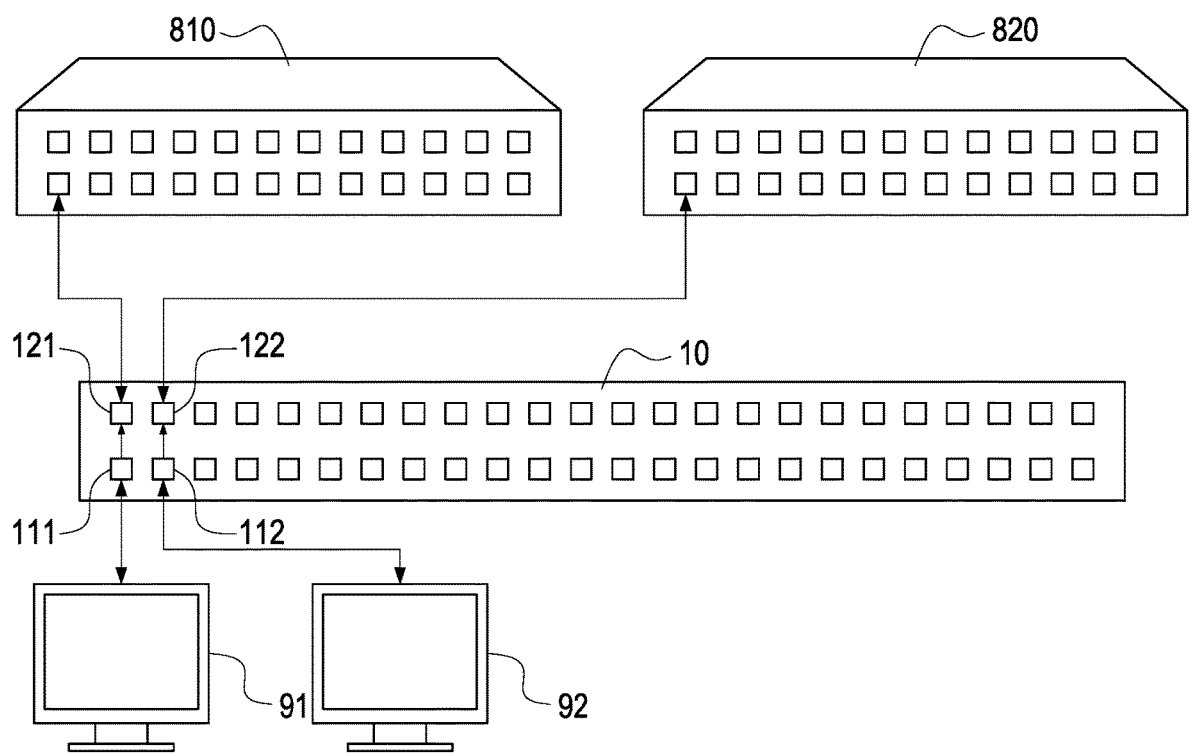
FIG. 4 illustrates an arrangement of the network security devices in accordance with another embodiment of the present disclosure.

Reference is made to FIG. 4. FIG. 4 illustrates an arrangement of the network security devices in accordance with another embodiment of the present disclosure. Compared with the network security device 10 in FIG. 2 that provides one input port 111 communicatively connected with the source device 91, the network security device 10 in FIG. 4 provides the plurality of input ports communicatively connected with multiple source devices. In FIG. 4, two input ports are taken as an example but the number of the input ports is not limited.

As shown in FIG. 4, the plurality of communication ports of the network security device 10 includes a plurality of input ports and a plurality of output ports. The plurality of input ports includes the input ports 111 and 112. The plurality of output ports includes the output ports 121 and 122.

In one embodiment, the input port 111 (i.e., a first primary input port) is communicatively connected with the source device 91 (i.e., a first source device), and the input port 112 (i.e., a second primary input port) is communicatively connected with a source device 92 (i.e., a second source device).

In one embodiment, the output port 121 (i.e., a first primary output port) is communicatively connected with the switch 810 (i.e., a first primary switch). The output port 122 (i.e., a second primary output port) is communicatively connected with the switch 820 (i.e., a second primary switch).

In one embodiment, the network security device 10 receives a traffic flow (i.e., a first traffic flow) of the source device 91 by the input port 111 and forwards the first traffic flow by the output port 121 to the switch 810. Also, the network security device 10 receives a traffic flow (i.e., a second traffic flow) of the source device 92 by the input port 112 and forwards the second traffic flow by the output port 122 to the switch 820. In the embodiment, the input port 111 and the output port 121 have their correspondence, the input port 112 and the output port 122 have their correspondence, and the output port 121 and the output port 122 have the backup relationship.

Figure 5:
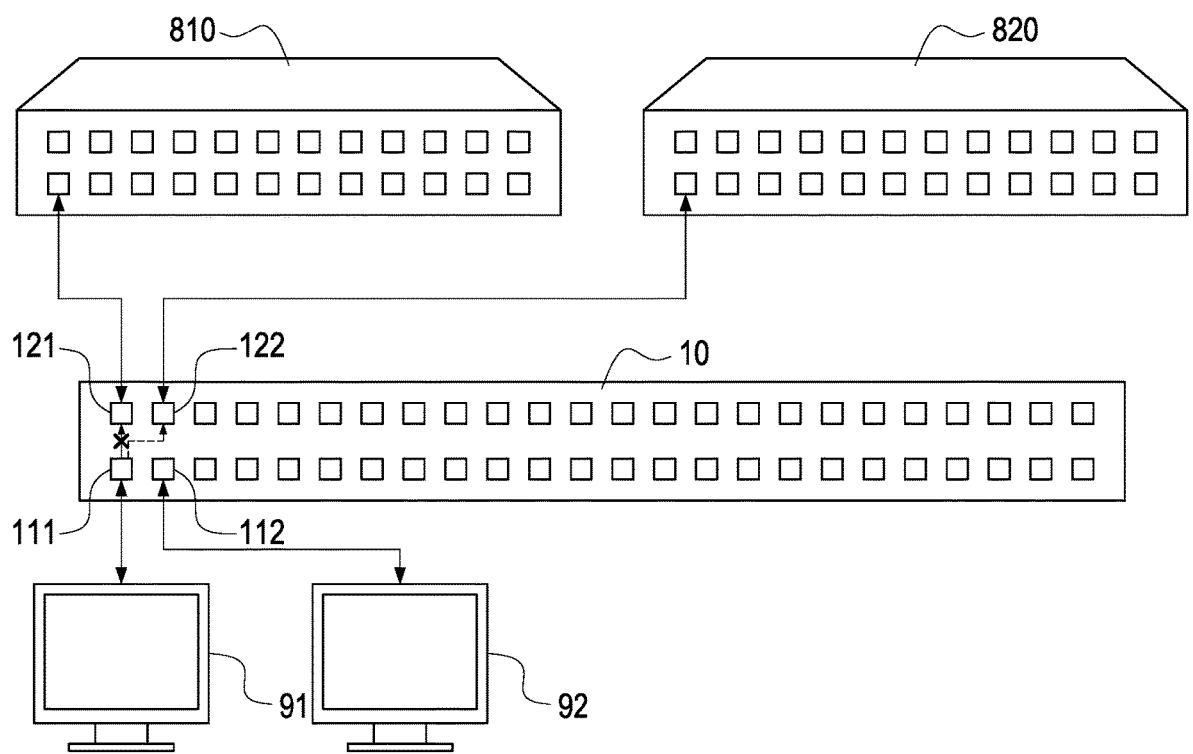
FIG. 5 is a schematic diagram illustrating that the network security device switches a primary port to a secondary port in accordance with one embodiment of the present disclosure.

Reference is made to FIG. 5. FIG. 5 is a schematic diagram illustrating that the network security device switches a primary port to a secondary port in accordance with one embodiment of the present disclosure.

Following the embodiment mentioned in FIG. 4 above, in FIG. 5, if the network security device 10 determines that the first traffic flow fails to be forwarded to the destination device by the switch 810, the output port for forwarding the first traffic flow is changed from the output port 121 to the output port 122.

In one embodiment, the output port 122 is the primary output port corresponding to the input port 112 and is the backup output port corresponding to the input port 111. In other words, the source device 91 utilizes the output port 122 as the backup output port, and the source device 92 utilizes the output port 122 as the primary output port. The backup port corresponding to the input port 111 and the primary port corresponding to the input port 112 is the same port, that is, the output port 122. In the embodiment, the source device 91 and the source device 92 share the output port 122, that is, the first traffic flow and the second traffic flow are forwarded to the switch 820 by the output port 122. In other words, the switch 820 is the primary switch of the source device 92 and is the backup switch of the source device 91.

Figure 6:
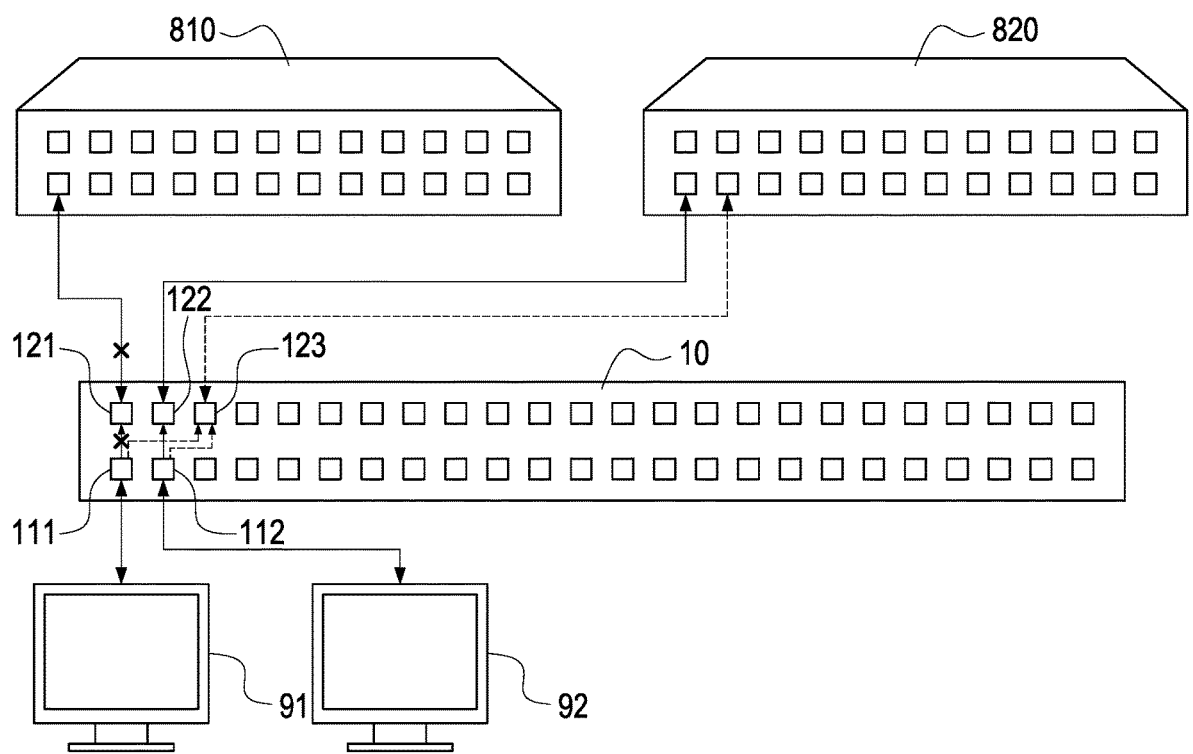
FIG. 6 is a schematic diagram illustrating that the network security device switches a primary port to a secondary port in accordance with another embodiment of the present disclosure.

FIG. 6 is a schematic diagram illustrating that the network security device switches a primary port to a secondary port in accordance with another embodiment of the present disclosure. In one embodiment, the input port 111 has the correspondence with the output port 121 and the output port 123 respectively. The input port 112 has the correspondence with the output port 122 and the output port 123 respectively. In other words, the output port 121 is the primary output port for forwarding the traffic flow of the source device 91, the output port 122 is the primary output port for forwarding the traffic flow of the source device 92, and the output port 123 is the backup output port for forwarding the traffic flow of the source device 91 and the source device 92. In the embodiment, the output port 123 is the backup output port for forwarding the traffic flow of the source device 91 and the source device 92 at the same time.

Figure 7:
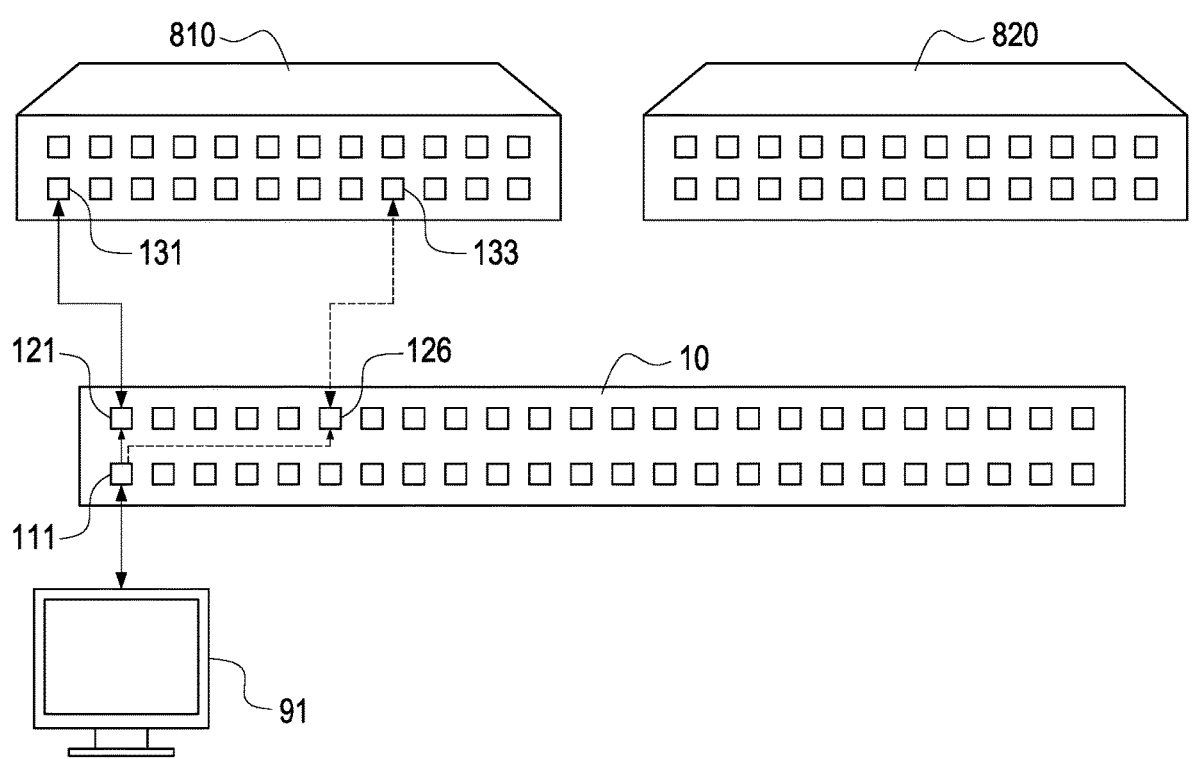
FIG. 7 illustrates an arrangement of the network security devices in accordance with another embodiment of the present disclosure.

Reference is made to FIG. 7. FIG. 7 illustrates an arrangement of the network security devices in accordance with another embodiment of the present disclosure. The network security device 10 includes a plurality of communication ports. The plurality of communication ports includes the input port 111, the primary output port 121, and the backup output port 126. The input port 111 of the network security device 10 is communicatively connected with the source device 91. The primary output port 121 of the network security device 10 is communicatively connected with the first port 131 of the switch 810. The backup output port 126 of the network security device 10 is communicatively connected with the second port 133 of the switch 810.

In one embodiment, the input port 111, the primary output port 121, and the backup output port 126 have the predetermined correspondence. In another embodiment, the input port 111 has the predetermined correspondence with the primary output port 121, and the primary output port 121 has the predetermined backup relationship with the backup output port 126.

In one embodiment, the network security device 10 receives the traffic flow of the source device 91 by the input port 111, where the traffic flow carries the information of the destination device.

In one embodiment, the network security device 10 forwards the traffic flow from the primary output port 121 to the first port 131 of the switch 810. When the network security device 10 determines that the traffic flow fails to be forwarded by the primary output port 121, the processor 120 searches the lookup table for the backup output port 126 corresponding to the input port 111 and switches the output port from the primary output port 121 to the backup output port 126. The network security device 10 then forwards the traffic flow by the backup output port 126 to the second port 133 of the switch 810. After receiving the traffic flow by the second port 133, the switch 810 then forwards the traffic flow to the destination device.

In one embodiment, the primary output port 121 and the backup output port 126 are configured to be paired by default. In another embodiment, the network security device 10 is configured by an external device for the setting of the backup relationship of the output ports, and the backup relationship is stored in the lookup table (e.g., the lookup table 132 in FIG. 1). In other words, the backup output port 126 is the output port corresponding to the primary output port 121 which the network security device 10 may obtain by searching for the lookup table 132. As shown in FIG. 7, the primary output port 121 corresponds to the backup output port 126. In another embodiment, the primary output port 121 may correspond to another output port that the another output port is the backup output port.

In one embodiment, the storage 130 of the network security device 10 mentioned above stores an information security inspection program. After receiving the traffic flow, the network security device 10 executes the information security inspection program, before forwarding the traffic flow by any output port to any switch, to detect whether the content of the traffic flow contains malicious behavior. The information security inspection program may be, but not limited to, the network packet analyzer or the protocol security detection.

In one embodiment, after executing the information security inspection program, the network security device 10 stops forwarding the traffic flow when determining that the traffic flow contains malicious behavior, to prevent the service system from being injured by the malicious behavior. In some circumstances, the determination of the malicious behavior may be a mistake: therefore, the normal network service will be unnecessarily terminated due to immediately stopping forwarding the traffic flow. In another embodiment, the network security device 10 does not stop forwarding the traffic flow even if the traffic flow is determined to contain the malicious behavior, and the network security device 10 records related information of the traffic flow in the log file instead. The log file provides the source information of the malicious behavior contained in the traffic flow for the user, so the user may disable the corresponding communication port of the network security device 10 to terminate the malicious behavior when the malicious behavior happens. The network security device 10 updates the information security detection rules based on the user feedback information, so the determination mechanism for the malicious behavior may be updated dynamically. In another embodiment, the network security device 10 forwards the traffic flow by the predetermined output port (i.e., the primary output port or the backup output port) to the corresponding switch when determining that the content of the traffic flow does not contain any malicious behavior.

Accordingly, the network security device provides the correspondence with the source device and the input port and the correspondence with the source device and the backup output port. When the traffic flow of the source device encounters transmission disturbance in the service system, that is, any network uplink fault occurs, the network security device automatically detects the fault and immediately takes the necessary measures without waiting for the administrator to troubleshoot, so the connection is recovered immediately. Therefore, the assurance of the uninterruption of the service system is provided, and the quality and stability of the service system is improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A network device, comprising:
  a plurality of communication ports, comprising:
    a plurality of input ports, comprising a first input port, wherein the first input port is communicatively connected with a first source device; and
    a plurality of output ports, comprising a first primary output port communicatively connected with a first primary switch and a first backup output port communicatively connected with a first backup switch, wherein each of the plurality of output ports has a correspondence with each of the plurality of input ports; and
  a processor, connected with the plurality of communication ports and configured to:
    receive a first traffic flow of the first source device by the first input port, wherein the first traffic flow carries information of a destination device;
    forward the first traffic flow from the first primary output port to the first primary switch;

switch from the first primary output port to the first backup output port when determining that the first traffic flow fails to be forwarded by the first primary switch to the destination device and forward the first traffic flow by the first backup output port to the first backup switch, such that the first traffic flow that is forwarded from the primary switch to the destination device is changed to be forwarded from the backup switch to the destination device;

keep the first primary output port idle when the first traffic flow is forwarded by the first backup output port to the first backup switch;

switch from the first backup output port back to the first primary output port when detecting that the first primary switch is capable of forwarding the first traffic flow to the destination device; and forward the first traffic flow by the first primary output port to the first primary switch and set the first backup output port to be idle;

wherein a storage is configured to store an information security inspection program, and the processor is configured to:

execute the information security inspection program to detect content of a traffic flow before forwarding the traffic flow by any of the output ports to any of the first primary switch and the first backup switch to determine whether the content of the traffic flow contains a malicious behavior; and record the content of the traffic flow to a log file, and optionally stopping forwarding the traffic flow when determining that the content of the traffic flow comprises the malicious behavior.

2. The network device of claim 1, further comprising the storage connected with the processor and configured to store a lookup table, and the lookup table configured to store the correspondence between each of the plurality of input ports with each of the plurality of output ports and a backup relationship between the first primary output port and the first backup output port;

wherein the processor is configured to:

read, from the lookup table, the first backup output port that is a backup of the first primary output port when determining that the first traffic flow fails to be forwarded from the first primary switch to the destination device; and switch from the first primary output port to the first backup output port to forward the first traffic flow by the first backup output port to the first backup switch.

3. The network device of claim 1, wherein the plurality of input ports further comprises a second input port communicatively connected with a second source device; and the plurality of output ports further comprises a second primary output port having the correspondence with the second input port, the second primary output port communicatively connected with a second primary switch, wherein the first backup output port and the second primary output port is same port and the first backup switch and the second primary switch is same switch;

wherein the processor is configured to:

receive a second traffic flow of the second source device by the second input port and forward the second traffic flow by the second primary output port to the second primary switch; and switch from the first primary output port to the first backup output port when determining that the first traffic flow fails to be forwarded from the first primary switch to the destination device, and forward the first traffic flow by the first backup output port to the first backup switch and forward the second traffic flow by the second primary output port to the second primary switch.

4. The network device of claim 2, wherein each of the plurality of communication ports comprises a unique identifier, wherein the correspondence stored in the lookup table comprises a relationship that the unique identifier of the first input port maps to the unique identifier of the first primary output port, and the backup relationship comprises the relationship that the unique identifier of the first primary output port maps the unique identifier of the first backup output port.

5. A network device, comprising:

a plurality of communication ports, comprising:

an input port, communicatively connected with a source device;

a primary output port, communicatively connected with a first port of a switch, wherein the primary output port and the input port are configured to be paired;

a backup output port, communicatively connected with a second port of the switch, wherein the backup output port and the primary output port are configured to be paired; and a processor connected with the plurality of communication ports and configured to:

receive a traffic flow of the source device by the input port, wherein the traffic flow carries information of a destination device;

forward the traffic flow by the primary output port to the first port;

switch from the primary output port to the backup output port when determining that the traffic flow fails to be forwarded by the primary output port to the destination device, and keep the primary output port idle when forwarding the traffic flow by the backup output port to the second port, so the switch forwards the traffic flow to the destination device;

switch from the backup output port back to the primary output port when detecting that the switch is capable of forwarding the traffic flow to the destination device through the primary output port;

forward the traffic flow by the primary output port to the switch and set the backup output port to be idle;

wherein a storage is configured to store an information security inspection program, and the processor is configured to:

execute the information security inspection program to detect content of the traffic flow before forwarding the traffic flow by any of the primary output port and the backup output port to the switch to determine whether the content of the traffic flow contains a malicious behavior; and record the content of the traffic flow to a log file, and optionally stopping forwarding the traffic flow when determining that the content of the traffic flow comprises the malicious behavior.

6. The network device of claim 5, further comprising the storage connected with the processor and configured to store a lookup table, and the lookup table configured to store a correspondence between the input port and the primary output port and a backup relationship between the primary output port and the backup output port;

wherein the processor is configured to:

read, from the lookup table, the backup output port that is a backup of the primary output port when determining that the traffic flow fails to be forwarded by the primary output port to the destination device; and switch from the primary output port to the backup output port to forward the traffic flow by the backup output port to the switch.

7. The network device of claim 6, wherein each of the plurality of communication ports comprises a unique identifier, wherein the correspondence stored in the lookup table comprises a relationship that the unique identifier of the input port maps to the unique identifier of the primary output port and the backup relationship comprises the relationship that the unique identifier of the primary output port maps to the unique identifier of the backup output port.

\* \* \* \* \*